United States Patent
Koziolek et al.

(10) Patent No.: US 11,675,487 B2
(45) Date of Patent: Jun. 13, 2023

(54) AUTOMATIC PROCESS GRAPHIC GENERATION

(71) Applicant: ABB Schweiz AG, Baden (CH)

(72) Inventors: Heiko Koziolek, Karlsruhe (DE); Michael Vach, Wilhelmsfeld (DE); Jens Doppelhamer, Ladenburg (DE)

(73) Assignee: ABB Schweiz AG, Baden (CH)

( * ) Notice: Subject to any disclaimer, the term of this patent is extended or adjusted under 35 U.S.C. 154(b) by 48 days.

(21) Appl. No.: 16/830,301

(22) Filed: Mar. 26, 2020

(65) Prior Publication Data

US 2020/0310390 A1 Oct. 1, 2020

(30) Foreign Application Priority Data

Mar. 28, 2019 (EP) .................................. 19 165 874

(51) Int. Cl.
*G06F 3/048* (2013.01)
*G06F 3/04845* (2022.01)
*G05B 19/418* (2006.01)
*G06T 11/20* (2006.01)

(52) U.S. Cl.
CPC ..... *G06F 3/04845* (2013.01); *G05B 19/4183* (2013.01); *G06T 11/206* (2013.01); *G05B 2219/31472* (2013.01)

(58) Field of Classification Search
CPC .... G06F 3/0485; G06F 3/0482; G06F 3/0487; G05B 19/4183; G05B 23/0221
See application file for complete search history.

(56) References Cited

U.S. PATENT DOCUMENTS

| | | | |
|---|---|---|---|
| 6,243,696 B1* | 6/2001 | Keeler | G06N 3/047 |
| | | | 706/907 |
| 7,295,119 B2* | 11/2007 | Rappaport | H04L 43/00 |
| | | | 705/28 |
| 7,515,977 B2* | 4/2009 | Eryurek | G06F 8/34 |
| | | | 700/83 |
| 9,182,755 B2 | 11/2015 | Bliss et al. | |
| 10,031,654 B2* | 7/2018 | Hams | G05B 19/418 |
| 10,481,770 B2* | 11/2019 | Gutermuth | G06F 3/0484 |
| 10,878,140 B2* | 12/2020 | Snyder | G06F 30/18 |

(Continued)

FOREIGN PATENT DOCUMENTS

| | | |
|---|---|---|
| EP | 3070554 A1 | 9/2016 |
| EP | 3165977 A1 | 5/2017 |

(Continued)

*Primary Examiner* — Linh K Pham
(74) *Attorney, Agent, or Firm* — Leydig, Voit & Mayer, Ltd.

(57) ABSTRACT

A method for an automatic generation of industrial process graphics includes: receiving engineering data, device data, and sensor data of an industrial plant having a plurality of field devices, the engineering data, device data, and sensor data being assigned to a single or multiple field devices; extracting field device information for each field device of a plurality of the field devices from the assigned engineering data, device data, and sensor data; and generating a plurality of process graphics for each field device of the plurality of the field devices. The plurality of process graphics for each field device covers a plurality of different abstraction levels of the industrial plant.

14 Claims, 3 Drawing Sheets

(56) References Cited

U.S. PATENT DOCUMENTS

| | | | |
|---|---|---|---|
| 2011/0218777 A1* | 9/2011 | Chen | G06F 30/00 703/1 |
| 2013/0095864 A1* | 4/2013 | Marovets | G06Q 30/0239 455/466 |
| 2015/0287318 A1* | 10/2015 | Nair | G06Q 10/10 340/5.6 |
| 2015/0369612 A1* | 12/2015 | Nishimura | G01C 21/3484 701/537 |
| 2016/0210569 A1* | 7/2016 | Enck | G06Q 10/0637 |
| 2017/0146986 A1* | 5/2017 | Libal | G05B 19/0428 |
| 2017/0270124 A1* | 9/2017 | Nagano | G06F 16/9024 |
| 2017/0293418 A1* | 10/2017 | Hams | G05B 19/418 |
| 2017/0322710 A1* | 11/2017 | Cockburn | G06F 3/04842 |
| 2018/0088566 A1 | 3/2018 | Billi-Duran et al. | |
| 2018/0300437 A1* | 10/2018 | Thomsen | G06F 16/24573 |
| 2019/0032948 A1 | 1/2019 | Nayak et al. | |
| 2019/0073827 A1* | 3/2019 | Coronado | G06T 19/006 |
| 2019/0236844 A1* | 8/2019 | Balasian | G06F 3/0304 |
| 2020/0096965 A1* | 3/2020 | Mazur | G05B 19/406 |
| 2020/0265329 A1* | 8/2020 | Thomsen | G05B 13/041 |
| 2022/0147037 A1* | 5/2022 | Akatsuka | G06F 3/04817 |

FOREIGN PATENT DOCUMENTS

| | | |
|---|---|---|
| EP | 3196716 A1 | 7/2017 |
| EP | 3428860 A1 | 1/2019 |
| WO | WO 2013131573 A1 | 9/2013 |

\* cited by examiner

AUTOMATIC PROCESS GRAPHIC GENERATION

CROSS-REFERENCE TO PRIOR APPLICATION

Priority is claimed to European Patent Application No. EP 19 165 874.9, filed on Mar. 28, 2019, the entire disclosure of which is hereby incorporated by reference herein.

FIELD

The invention relates to process graphics generation. In particular, the present invention relates to a method and a system for an automatic generation of industrial process graphics.

BACKGROUND

Graphical displays allow commissioning, operating, and servicing and industrial plant. A large number of displays may show the plant and its state at various abstraction levels and for various purposes.

Graphical displays show static aspects, such as the overall plant layout, as well as dynamic aspects, such as sensor readings and derived or aggregated values. Engineers typically configure such graphics early in the plant lifecycle, i.e., before commissioning.

This step involves understanding existing process descriptions, selecting elements relevant for human operators, then using a graphical modeling tool to layout the graphics, configuring the appropriate data sources and sinks, and optionally defining certain calculations on the data, e.g., aggregations.

Consequently, it is a costly engineering step with lots of manual, error-prone labor. Engineers may have to update process graphics after initial commissioning and over the course of the full plant lifecycle, when the control strategies are changed or additional field devices are added.

This becomes a more frequent activity with the recent trend to add many low-cost internet of things sensors, which enhance the plant instrumentation in a low-intrusive way. Updating all displays manually is a laborious, cost-intensive, and potentially error-prone task.

SUMMARY

In an embodiment, the present invention provides a method for an automatic generation of industrial process graphics, comprising: receiving engineering data, device data, and sensor data of an industrial plant comprising a plurality of field devices, the engineering data, device data, and sensor data being assigned to a single or multiple field devices; extracting field device information for each field device of a plurality of the field devices from the assigned engineering data, device data, and sensor data; and generating a plurality of process graphics for each field device of the plurality of the field devices, wherein the plurality of process graphics for each field device covers a plurality of different abstraction levels of the industrial plant.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
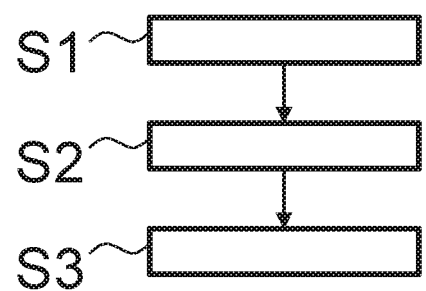
FIG. 1 shows a schematic diagram of a flowchart diagram of a method for an automatic generation of industrial process graphics according to an embodiment of the invention.

There may be a need to overcome the drawbacks from existing systems for automatic generation of process graphics.

This need is met by embodiments of the present invention.

A first aspect of the present invention relates to a method for an automatic generation of industrial process graphics, the method comprising the following steps of: receiving engineering data, device data and sensor data of an industrial plant comprising a plurality of field devices, wherein the engineering data, device data and sensor data are assigned to a single or multiple field devices; extracting field device information for each field device of the plurality of the field devices from the assigned engineering data, device data and sensor data; and generating a plurality of process graphics for each field device of the plurality of the field devices, wherein the plurality of process graphics for each field device covers a plurality of different abstraction levels of the industrial plant.

The present invention advantageously introduces a new tool-supported process graphics generation system that utilizes self-describing information models for field devices, which are enhanced with information required for process graphics. Upon connecting field devices to the network, they are automatically recognized by the system, and their device descriptions are accessed and interpreted. The extracted information allows the system to synthesize process graphics on different abstraction levels without manual engineering work.

From the information gathered, the system generates process graphics, potentially using a library of graphical shapes for typical elements used in the process graphics of the plant. It creates visuals for e.g. tanks, pipes, valves, pumps, boilers and motors.

The system may also connect the elements and visuals graphically (e.g., with lines representing pipes) if appropriate. This is done for displays on different hierarchy levels and intended for different tasks, e.g. for overview process displays of the whole industrial plant section or for a single module of the industrial plant or for faceplates of individual devices. The system presents the generated process graphics to a human operator for final approval, possibly allowing to add or remove certain elements.

According to an embodiment of the present invention, the method further comprises the step of creating a hierarchical structure based on the process graphics for at least two field devices of the plurality of the field devices, wherein the hierarchical structure is based on a process of the at least two field devices.

According to an embodiment of the present invention, the hierarchical structure is based on device relationships of the at least two field devices defined in device descriptions as stored in the device data.

According to an embodiment of the present invention, the device data comprises at least one of the following information:
  i) at least one geographic coordinate of at least one field device of the plurality of the field device;
  ii) a generic structure in which product features of industrial-process measurement and control equipment with analogue or digital output are arranged, including device dimensions, types, features, or parameters;
  iii) at least one relationship of one field device of the plurality of the field devices to another field device of the plurality of the field devices;
  iv) module type package, MTP, information of one field device of the plurality of the field devices, the MTP information optionally including process graphics, fragments of a textual description;
  v) building information modeling, BIM, description data of one field device of the plurality of the field devices or BIM description data for the industrial plant.

According to an embodiment of the present invention, the method further comprises the following step of using a library of process graphics for the plurality of field devices used for the industrial plant.

According to an embodiment of the present invention, the field devices comprise tanks, pipes, valves, pumps, boilers, and motors.

According to an embodiment of the present invention, the method further comprises the following step of connecting at least two of the process graphics for at least two field devices of the plurality of the field devices.

According to an embodiment of the present invention, the method further comprises the step of displaying the generated plurality of process graphics for each field device of the plurality of the field devices to a human operator.

According to an embodiment of the present invention, the method further comprises the step of receiving approval by a user for the displayed plurality of process graphics for each field device, wherein optionally the user may change at least one process graphic of the displayed plurality of process graphics.

A second aspect of the present invention relates to a system for an automatic generation of industrial process graphics. The system comprises a receiver, which is configured to receive engineering data, device data and sensor data of an industrial plant comprising a plurality of field devices, wherein the engineering data, device data and sensor data are assigned to a single or multiple field devices.

The system comprises a processor, which is configured to extract field device information for each field device of the plurality of the field devices from the assigned engineering data, device data and sensor data.

The processor is further configured to generate a plurality of process graphics for each field device of the plurality of the field devices, wherein the plurality of process graphics for each field device covers a plurality of different abstraction levels of the industrial plant.

According to an embodiment of the present invention, the processor is further configured to create a hierarchical structure based on the process graphics for at least two field devices of the plurality of the field devices, wherein the hierarchical structure is based on a process of the at least two field devices.

According to an embodiment of the present invention, the hierarchical structure is based on a device relationship of the at least two field devices defined in device descriptions as stored in the device data.

According to an embodiment of the present invention, the device data comprises at least one of the following information:
  i) at least one geographic coordinate of at least one field device of the plurality of the field device;
  ii) a generic structure in which product features of industrial-process measurement and control equipment with analogue or digital output are arranged, including device dimensions, types, features, or parameters;
  iii) at least one relationship of one field device of the plurality of the field devices to another field device of the plurality of the field devices;
  iv) module type package, MTP, information of one field device of the plurality of the field devices, the MTP information optionally including process graphics, fragments of a textual description; and
  v) building information modeling, BIM, description data of one field device of the plurality of the field devices or BIM description data for the industrial plant.

According to an embodiment of the present invention, the processor is configured to use a library of process graphics for the plurality of field devices used for the industrial plant.

According to an embodiment of the present invention, the processor is configured to connect at least two of the process graphics for at least two field devices of the plurality of the field devices.

These and other aspects of the invention will be apparent from and elucidated with reference to the embodiments described hereinafter.

FIG. 1 shows a schematic diagram of a flowchart diagram of a method for an automatic generation of industrial process graphics according to an embodiment of the invention.

The in FIG. 1 depicted method for an automatic generation of industrial process graphics comprises the following steps:

As a first step, receiving S1 engineering data, device data and sensor data of an industrial plant comprising a plurality of field devices, wherein the engineering data, device data and sensor data are assigned to a single or multiple field devices is performed.

The engineering data, the device data or the sensor data is received from any device out of the plurality of field devices, for example via network discovery, so that the method operates during plant operation and not only during planning and dimensioning of the industrial plant.

As a second step, extracting S2 of field device information for each field device of the plurality of the field devices from the assigned engineering data, device data and sensor data is performed.

As a third step, a generating S3 of a plurality of process graphics for each field device of the plurality of the field devices, wherein the plurality of process graphics for each field device covers a plurality of different abstraction levels of the industrial plant is performed.

According to an exemplary embodiment of the present invention, to collect information for process graphics generation, the system may use at least one of the following:
  i. Network discovery techniques to detect newly connected devices and to infer network topology for more structural information. This may include multicast DNS protocol, mDNS, Zero-configuration networking, ZeroConf, universal plug and play, UPnP and other protocols;
  ii. Information from browsing servers of e.g. devices or modules found in the system, e.g. web servers, OPC UA; servers, or other sources of self-description available, both proprietary and standardized, (e.g. OPC UA for Devices)

iii. Image recognition, using for example camera data, fix-mounted cameras, or from drone-fly-by in plant to recognize pipes, cables, other physical connectors iv. Existing related process graphics and other device or system information found in the control system.

According to an exemplary embodiment of the present invention, the engineering data, device data and sensor data of the industrial plant may further comprise:

i. Available ISO 15926 data models for the plant; and/or ii. Available Building Information Modeling (BIM) models for the plant.

Figure 2:
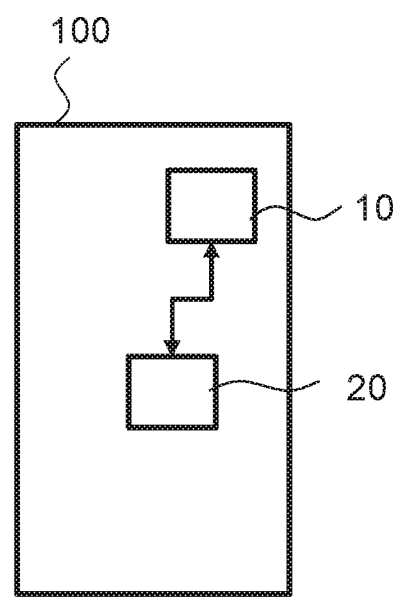
FIG. 2 shows a schematic diagram of a system for an automatic generation of industrial process graphics according to an embodiment of the invention.

FIG. 2 shows a schematic diagram of an auto layouter module according to an embodiment of the invention.

A system for an automatic generation of industrial process graphics may comprise a receiver 10 and a processor 20.

The receiver 10 is configured to receive engineering data, device data and sensor data of an industrial plant comprising a plurality of field devices, wherein the engineering data, device data and sensor data are assigned to a single or multiple field devices.

The engineering data, the device data or the sensor data is received from any device out of the plurality of field devices, for example via network discovery, so that the system for the automatic generation is enabled to operate during plant operation and not only during planning and dimensioning of the industrial plant.

The processor 20 is configured to extract field device information for each field device of the plurality of the field devices from the assigned engineering data, device data and sensor data;

The processor 20 is further configured to generate a plurality of process graphics for each field device of the plurality of the field devices, wherein the plurality of process graphics for each field device covers a plurality of different abstraction levels of the industrial plant.

According to an exemplary embodiment of the present invention, the system may generate new or updated process graphics offline, e.g. during a plant maintenance cycle. It may also generate graphics online, i.e. in real-time, if specific requirements are met (e.g. only updates and smaller changes).

According to an exemplary embodiment of the present invention, the system can predict relationships between field devices, for example based on physical proximity determined from geo coordinates.

According to an exemplary embodiment of the present invention, the system may also predict the graphical representation of equipment that is not connected to the network (e.g., tanks, pipes, cables, etc.) by processing the configuration of individual field devices.

According to an exemplary embodiment of the present invention, the level transmitter for measuring the filling level within an industrial tank may be configured for certain tank dimensions, reflected by configuration parameters in the device information model.

According to an exemplary embodiment of the present invention, the system may require approval of changed or added systems from a human. The information collection tasks mentioned above can be scheduled to run periodically in the background to ascertain if a change to the plant topology has occurred. The user can then be asked if new UI elements should be generated for the identified changes.

Figure 3:
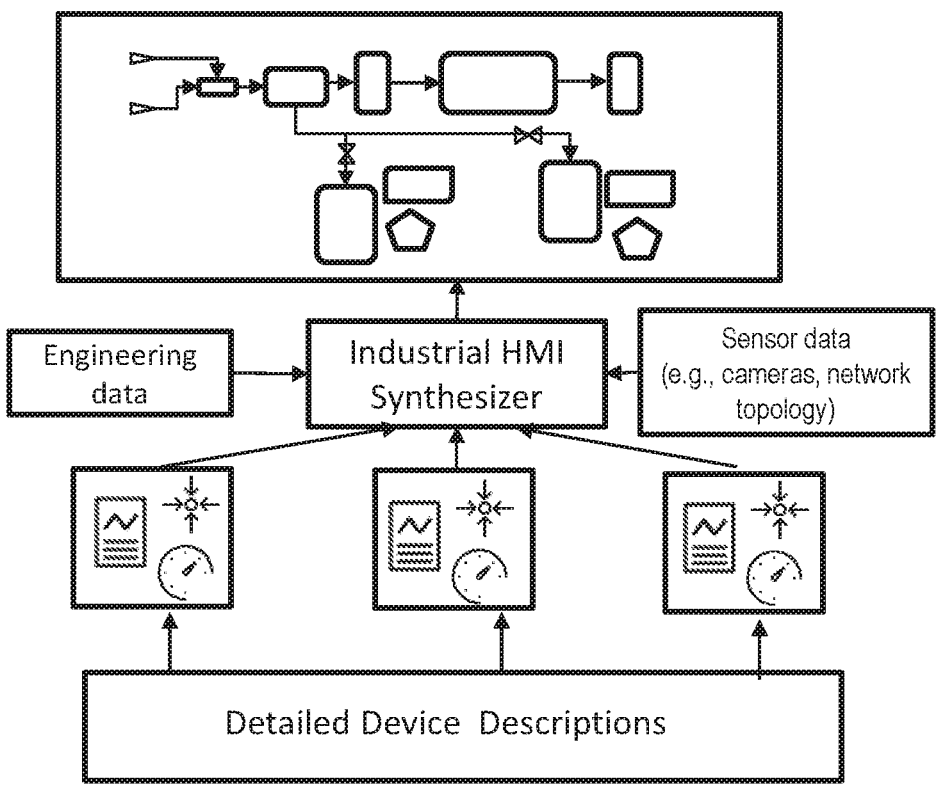
FIG. 3 shows a flowchart of an automatic generation of industrial process graphics according to an embodiment of the invention.

FIG. 3 shows a flowchart of an automatic generation of industrial process graphics according to an embodiment of the invention.

The present invention advantageously provides avoiding any manual changes laborious, error-prone, cumbersome work.

The further advantages of the present invention are given by utilizing network discovery (HART/PROFINET/OPC UA, etc.) and detailed device descriptions of any field device of the industrial plant to generate process graphics on-the-fly, geo-coordinates, the so-called eCl@ss properties, a product classification for classification of products and services are used.

According to an exemplary embodiment of the present invention, the system may infer hierarchical graphics of a whole process, not only individual device HMIs (e.g., as FDT/FDI).

According to an exemplary embodiment of the present invention, the system may infer device relationships out of device descriptions or further extra information, e.g. included by visual data from any inspection of for instance a drone fly-by of the industrial plant.

According to an exemplary embodiment of the present invention, the system may update process graphics composition and/or update the layout at runtime.

According to an exemplary embodiment of the present invention, the system may identify existing graphics that need to be updated.

The present invention advantageously provides save engineering efforts, provides immanent up-to-date graphics and further provides lower barriers for internet of things sensors.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for an automatic generation of industrial process graphics, comprising:

receiving engineering data, device data, and sensor data of an industrial plant comprising a plurality of field devices, the engineering data, device data, and sensor data being assigned to a single or multiple field devices;

extracting field device information for each field device of the plurality of the field devices from the assigned engineering data, device data, and sensor data;

automatically generating a plurality of process graphics for each field device of the plurality of the field devices; and creating a hierarchical structure based on the process graphics for at least two field devices of the plurality of field devices, wherein the hierarchical structure is based on a process of the at least two field devices, wherein the hierarchical structure is based on a device relationship of the at least two field devices defined in device descriptions as stored in the device data, wherein the plurality of process graphics for each field device covers a plurality of different abstraction levels of the industrial plant, wherein the device data comprises a geographic coordinate of each of the at least two field devices of the plurality of the field devices, and wherein the device relationship of the at least two field devices is based on a physical proximity of the at least two field devices to one another, the physical proximity being determined based on the geographic coordinates of the at least two field devices.

2. The method according to claim 1, wherein the device data further comprises at least one of:
   i) a generic structure in which product features of industrial-process measurement and control equipment with analogue or digital output are arranged, including device dimensions, types, features, or parameters;
   ii) at least one relationship of one field device of the plurality of the field devices to another field device of the plurality of the field devices;
   iii) module type package (MTP) information of one field device of the plurality of the field devices;
   iv) building information modeling (BIM) description data of one field device of the plurality of the field devices or BIM description data for the industrial plant.

3. The method according to claim 2, wherein the device data comprises iv) module type package (MTP) information of one field device of the plurality of the field devices, the MTP information including process graphics, fragments of a textual description.

4. The method according to claim 1, further comprising using a library of process graphics for the plurality of field devices used for the industrial plant.

5. The method according to claim 1, wherein the field devices comprise at least one of tanks, pipes, valves, pumps, boilers, or motors.

6. The method according to claim 1, further comprising connecting at least two of the process graphics for at least two field devices of the plurality of the field devices.

7. The method according to claim 1, further comprising displaying the generated plurality of process graphics for each field device of the plurality of the field devices to a human operator.

8. The method according to claim 7, further comprising receiving approval by a user for the displayed plurality of process graphics for each field device.

9. The method according to claim 8, wherein the user may change at least one process graphic of the displayed plurality of process graphics.

10. A system for an automatic generation of industrial process graphics, the system comprising:
    a receiver configured to receive engineering data, device data, and sensor data of an industrial plant comprising a plurality of field devices, the engineering data, device data, and sensor data being assigned to a single or multiple field devices; and
    a processor configured to extract field device information for each field device of the plurality of the field devices from the assigned engineering data, device data, and sensor data, the processor being further configured to generate a plurality of process graphics for each field device of the plurality of the field devices and create a hierarchical structure based on the process graphics for at least two field devices of the plurality of the field devices,
    wherein the hierarchical structure is based on a process of the at least two field devices,
    wherein the hierarchical structure is based on a device relationship of the at least two field devices defined in device descriptions as stored in the device data,
    wherein the plurality of process graphics for each field device covers a plurality of different abstraction levels of the industrial plant,
    wherein the device data comprises a geographic coordinate of each of the at least two field devices of the plurality of the field devices, and
    wherein the device relationship of the at least two field devices is based on a physical proximity of the at least two field devices to one another, the physical proximity being determined based on the geographic coordinates of the at least two field devices.

11. The system according to claim 10, wherein the device data further comprises at least one of:
    i) a generic structure in which product features of industrial-process measurement and control equipment with analogue or digital output are arranged, including device dimensions, types, features, or parameters;
    ii) at least one relationship of one field device of the plurality of the field devices to another field device of the plurality of the field devices;
    iii) module type package (MTP) information of one field device of the plurality of the field devices;
    iv) building information modeling (BIM) description data of one field device of the plurality of the field devices or BIM description data for the industrial plant.

12. The system according to claim 11, wherein the device data comprises iv) module type package (MTP) information of one field device of the plurality of the field devices, the MTP information including process graphics, fragments of a textual description.

13. The system according to claim 10, wherein the processor is configured to use a library of process graphics for the plurality of field devices used for the industrial plant.

14. The system according to claim 10, wherein the processor is configured to connect at least two of the process graphics for at least two field devices of the plurality of the field devices.

* * * * *